UNITED STATES PATENT OFFICE.

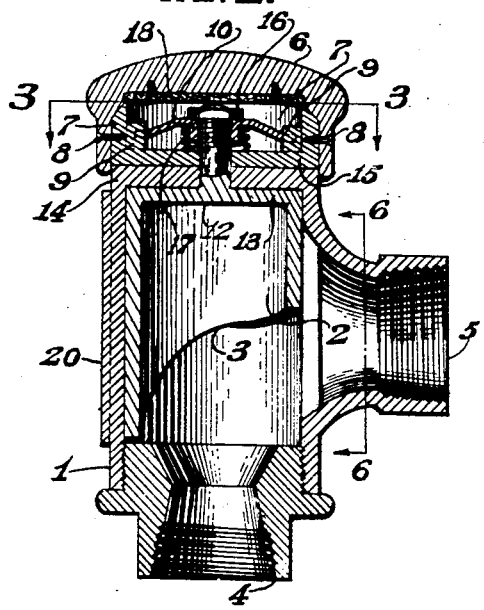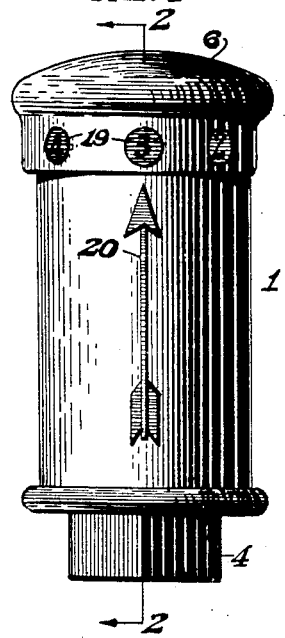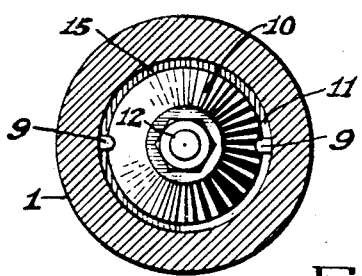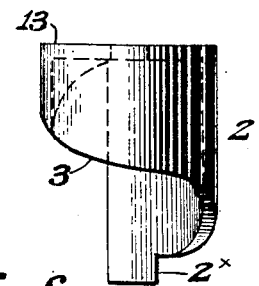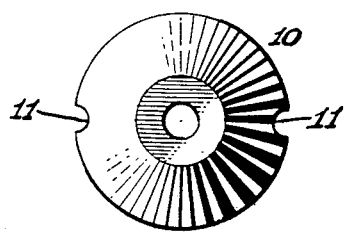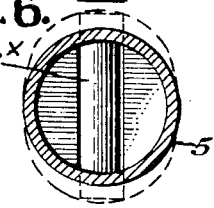

THOMAS G. JONES, OF PHILADELPHIA, PENNSYLVANIA.

VALVE.

1,397,867.  Specification of Letters Patent.  Patented Nov. 22, 1921.

Application filed May 26, 1920. Serial No. 384,446.

*To all whom it may concern:*

Be it known that I, THOMAS G. JONES, a citizen of the United States, residing in the city and county of Philadelphia, State of Pennsylvania, have invented a new and useful Valve, of which the following is a specification.

My invention consists in providing the movable member of a valve with a port of varying dimensions adapted to discharge a variable volume of water, vapor, or other fluid, and means for preventing leakage of said movable member with the contiguous part of the casing or body of the valve.

It consists of means adapted to rotate the movable member, the same having thereon spaced apart characteristics adapted to inform the operator the extent to which said member is to be rotated relatively to the extent that said variable port is to be uncovered or entirely covered, and an index finger or pointer on the casing with which either of said characteristics is to register for accuracy in the adjustment of said member.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a valve embodying my invention.

Fig. 2 represents a central longitudinal section thereof on line 2—2 Fig. 1.

Fig. 3 represents a horizontal section on line 3—3 Fig. 2.

Fig. 4 represents a side elevation of the movable member of the valve.

Fig. 5 represents a top or plan view of a washer employed.

Fig. 6 represents a section on line 6—6 Fig. 2.

Similar numerals of reference indicate corresponding parts in the figures.

Referring to the drawings:—

1 designates the body or casing of the valve, and 2 designates the movable member therein, the latter occupying said body and being hollow and cut-away partly on its side forming the spiral edge 3 acting as a variable port whereby a greater or less amount of water or other fluid may enter said member from the inlet nozzle 4 and be discharged in the same proportion at the outlet nozzle 5 and so a variable amount of water or other fluid may be admitted into the member 2 and discharged therefrom and the casing to say a radiator or other object to which the water or fluid is to be directed, the part $2^x$ of the member being adapted to be covered by the solid wall of the casing whereby the discharge of fluid is cut off, see Fig. 6.

6 designates a knob-like member forming a handle which is fitted on the outer side of the cup or inverted cap 7 and secured thereto by the screws 8, said cup having on its inner side the lugs 9 which are adapted to be engaged by the washer 10 which consists of a disk of metal or other material having in its periphery the recesses 11, which are adapted to have said lugs 9 enter the same, thus preventing rotary movement of said washer.

12 designates a bolt which is connected centrally with the top wall 13 of the movable member 2 of the valve, passed through the top 14 of the casing 1, the base 15 of the cup 7 and the washer 10, its threaded end which is above having thereon the jam nut 16 which is adapted to tighten against the upper side of the washer 10 whereby by rotating the knob 6 rotary motion may be imparted to the cup 7, the washer 10, the bolt 12 and consequently the member 2 and thus the latter may be turned to the required extent to cause a larger or smaller volume of water or fluid to pass into the member and be discharged therefrom or to be entirely cut off from entering or leaving the valve, this being due to the position of the spiral edge of the member 2 relatively to the inlet and outlet nozzles of the device.

Interposed between the underside of the washer 10 and the upper side of the base 15 of the cup 7 is the coil spring 17 which surrounds the adjacent portion of the bolt 12 and is adapted to be adjusted in tension by the action of the nut 16 whereby the top wall of the movable member 2 may engage frictionally to a greater or less extent with the underside of the top wall 14 of the casing 1, so as to form a fluid tight joint for said walls and prevent leakage of fluid thereat, it being noticed that when the screws 8 are released from the side of the cup 7 the knob 6 may be removed, and thus access is had to the nut 16 for adjusting the tension of the spring 17, and the removal of the washer and said spring if desired. On the underside of the knob 6 is a lining 18 of asbestos with which the peripheral wall of the cup is adapted to contact thus serving to keep said knob in cool condition.

On the exterior side of the rim of the knob 6 there are numerals 19 or other characteristics which are spaced apart around said rim and on the exterior side of the casing 1 is the index finger 20 which is cast therewith flat thereon and is adapted to point to either of said numerals, both numerals and index finger being most plainly visible from the side of the device, so as to guide an operator in properly rotating the movable member 2 of the valve, whereby the amount of fluid that is admitted into said member and discharged therefrom may be set, it being evident that when the port formed by the edge 3 of the cutaway portion of the member is entirely covered by the solid portion of the wall of the casing it is indicated by zero being at the point of the index, and so showing that the fluid is cut off, and the valve is not in operation.

Having thus described my invention what I claim as new and desire to secure by Letters Patent, is:—

1. In a valve, a casing, a rotatable hollow member therein, the side wall of said member being cut away partly forming a port of variable size for the admission and discharge of fluid into and from said member in different volumes, a rotatable handle-like device on said casing adapted to be connected with said member for operating the latter, and a cup-like member on said casing and being connected with said handle-like device, a bolt-like member connected with said hollow member and passing into said cup, a washer on said bolt-like member engageable with said cup, and a tightening device on said bolt-like member adapted to engage said washer.

2. In a valve, a casing, a hollow rotatable member therein, the side wall of said member being cut away partly forming a port of variable size, a cup on said casing, a connecting bolt for said member with said casing, a nut on said bolt, and resilient means in said cup interposed between said nut and the base of said cup for exerting upward pressure on said member on the adjacent wall of said casing.

3. In a valve, a casing, a rotatable hollow member therein, the side of the latter having therein a port of variable size, a cup on said casing, a washer on said cup, a bolt in said washer adapted to pass through said cup and the top of said casing and connectible with said member, and an adjusting device on said bolt adapted to be seated on said washer.

4. In a valve, a casing, a rotatable member therein, the side of the latter having therein a port, a cup on said casing, a washer in said cup, a bolt adapted to be passed through said washer and connectible with said rotatable member, said cup having thereon lugs with which the peripheral portion of said washer is engageable, and a nut on said bolt adapted to be seated on said washer.

5. In a valve, a casing, a rotatable member therein, the side of the latter having therein a port, a cup on said casing, a washer in said cup, a bolt adapted to be passed through said washer and connectible with said rotatable member, said cup having thereon lugs with which the peripheral portion of said washer is engageable, a nut on said bolt adapted to be seated on said washer, and resilient means interposed between said washer and a portion of said cup.

6. In a valve of the character stated, a casing, a movable member therein, and a knob mounted on said casing adapted to rotate said member, said knob having on its underside a lining of asbestos adapted to have the wall of the member to which the knob is affixed contact therewith and so serve to keep said knob in comparatively cool condition.

THOMAS G. JONES.

Witnesses:
 JOHN A. WIEDERSHEIM,
 N. BUSSINGER.